No. 810,061. PATENTED JAN. 16, 1906.
C. A. LEE.
PNEUMATIC CUSHION WHEEL.
APPLICATION FILED JUNE 28, 1905.
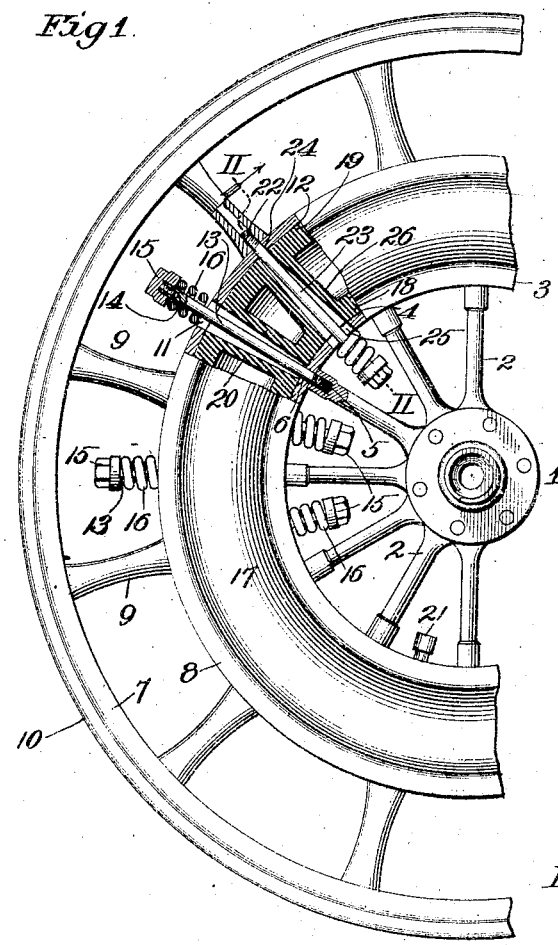
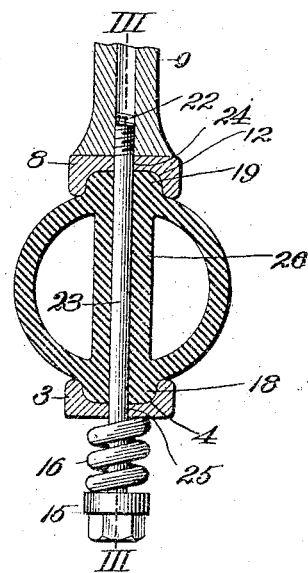
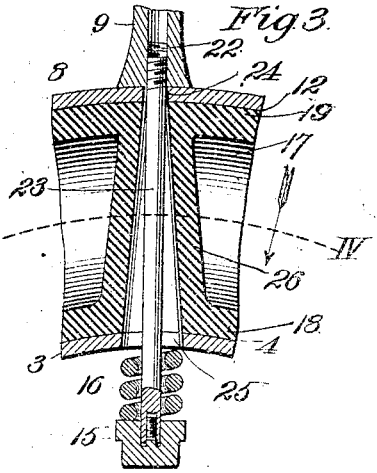
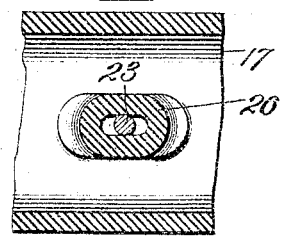
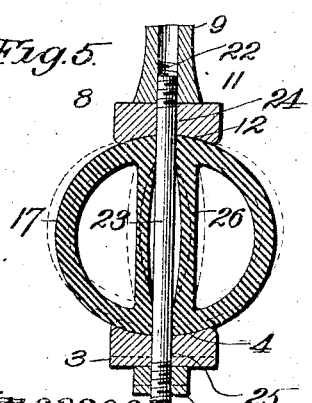
Witnesses
Frank R. Slone
H. C. Rodgers
Inventor
C. A. Lee
By George J. Thorpe
Atty.

UNITED STATES PATENT OFFICE.

CHARLES A. LEE, OF KANSAS CITY, KANSAS, ASSIGNOR OF ONE-HALF TO ALBERT J. HOLZMARK, OF KANSAS CITY, KANSAS.

PNEUMATIC-CUSHION WHEEL.

No. 810,061.      Specification of Letters Patent.      Patented Jan. 16, 1906.

Application filed June 28, 1905. Serial No. 267,471.

*To all whom it may concern:*

Be it known that I, CHARLES A. LEE, a citizen of the United States, residing at Kansas City, in the county of Wyandotte and State of Kansas, have invented certain new and useful Improvements in Pneumatic-Cushion Spring-Wheels, of which the following is a specification.

My invention relates to pneumatic-cushion wheels for automobiles and other vehicles, and more especially to that type consisting of rigid central and outer portions with a pneumatic cushion between them to permit the said portions to play vertically and assume eccentric relations with respect to each other in order to cushion the shock or jar incident to travel over rough or uneven surfaces, and thereby conduce to the comfort of the occupants and reduce the wear and tear on the machinery of the vehicle, my object being to produce a wheel of this character having a steel or solid cushion tire and possessing the desirable features of strength, durability, and cheapness and the resiliency of a wheel equipped with a pneumatic tire.

To this end the invention consists in certain novel and peculiar features of construction and organization, as hereinafter described and claimed, and in order that it may be fully understood reference is to be had to the accompanying drawings, in which—

Figure 1 is a side elevation of a part of a wheel embodying my invention. Fig. 2 is a section taken on the line II II of Fig. 1. Fig. 3 is section taken on the line III III of Fig. 2. Fig. 4 is a section on the line IV IV of Fig. 3. Fig. 5 is a section of the character shown by Fig. 2, but of a modified construction.

In the said drawings the inner portion of of the wheel comprises the hub portion 1, the radiating spokes 2, and the ring 3, encircling said spokes and having its periphery grooved, as at 4, the groove 4 of Fig. 2 being of greater depth than that shown in Fig. 5 and of slightly different cross-sectional form.

By preference all or a plurality of the spokes of this inner portion are tubular and internally threaded at their outer ends, as at 5, and the encircling ring is provided with apertures 6, registering with said threaded passages 5.

The outer portion of the wheel comprises the metallic outer ring 7, the inner ring 8, and radiating, and preferably tubular, spokes 9, connecting said rings and arranged alternately with respect to the spokes 2 of the inner portion of the wheel. The outer ring 7 may form the tire of the wheel or it may be externally grooved and equipped with a rubber or equivalent tire 10, so that the wheel shall run as noiselessly as possible. In radial alinement with spokes 2 the inner ring 8 is provided with slots 11, and the inner side of said ring is grooved, as at 12, the groove 12 of the ring shown in Fig. 2 being of greater depth than the similar groove of Fig. 5 and of different cross-sectional form.

13 indicates rods extending through the alined apertures 6 and slots 11 and having their inner ends threaded and engaging the threaded passages 5 of spokes 2. The outer ends of rods 13 are provided with threaded passages 14 for engagement by the cap-screws 15, cushions 16 of any suitable type, but preferably of the spring-coil type shown, being mounted on the rods and interposed between the cap-screws and the outer side of ring 8.

17 indicates a circular pneumatic cushion fitting snugly between and seated in the grooves 4 and 12, respectively, of rings 3 and 8, the cushion in the construction shown in Figs. 1, 2, and 3 being provided with an inner reinforcement or rib 18, engaging groove 4, and an outer rib or reinforcement 19, engaging groove 12. In radial alinement with the apertures 6 and slots 11 the cushion is provided with tubular cross-pieces 20, the passages of said tubular cross-pieces being of substantially oblong form in cross-section, so as to fit snugly against the outer and inner sides of rods 13 and assist in guarding against any lateral movement bodily of the tire independent of the rings 3 and 8. The elongation of the passages of said tubular cross-pieces is in a plane at right angles to the axis of the wheel, and they taper toward their inner ends, which are approximately of the same size as apertures 6, to their outer ends, where they are of approximately the same form as slots 11. The pneumatic cushion will be provided with the usual valve-stem, as at 21, extending, by preference, inwardly through the inner ring 3 in order that the cushion may be inflated to the desired degree whenever necessary or desirable.

In lieu of the construction described a construction may be employed which in principle is the same, or the two constructions may be made coöperative. In such reverse construction the inner ends of all or a number of the spokes 9 will be threaded internally, as at 22. 23 indicates rods which are of precisely the same construction as rods 13 and may be duplicates of said rods reversed, so that their threaded ends shall be disposed outwardly and engage threaded passages 22. In this case the rods 23 extend through apertures 24 in ring 8, corresponding to apertures 6 in ring 3, and through slots 25 in ring 3, corresponding to slots 11 in ring 8, the inner ends of the rods 23 being of the same construction as and equipped with cap-screws and springs corresponding to cap-screws and springs 15 and 16 of rods 13.

In the reverse construction under consideration the pneumatic cushion would be provided with tubular cross-pieces 26 of precisely the same construction and form as tubular cross-pieces 20, except that the passages of said cross-pieces would taper outwardly instead of inwardly. As hereinbefore suggested, the wheel may embody both constructions, and consequently be of increased rigidity and strength, so as to avoid any possibility of independent lateral movement of the tire or outer portion of the wheel with respect to the inner portion.

Referring particularly to Fig. 5, it will be noticed that the springs 16 are dispensed with and the cap-screws engage the contiguous ring. This construction is operative, but is not the preferred construction, because in the vertical play of the inner portion of the wheel when in practical use, and the consequent movement of the cushion there would be more or less noise occasioned by the contact of the cap-screw with the contiguous ring. The cushions will compensate for this play, so as to maintain a tensile strain on the rods at all times, and thereby guard against rattling occasioned by the repeated impacts of metal against metal.

In the practical operation of the wheel the weight of the vehicle depresses the axis of the inner portion of the wheel vertically below the axis of the outer portion, the lower portion of the pneumatic cushion flattening somewhat, because of the imposition of the weight thereon. In this action the cushion will consequently move with the inner portion of the wheel to some extent with respect to the outer portion, and therefore must have a sliding relation with the rods, and to accommodate this movement of the cushion without imposing undue friction thereon, which might heat it sufficiently to injuriously affect it, the passages of the contiguous bridge-pieces are of the peculiar form explained, the passages fitting snugly against the rods at their inner and outer sides, so as to coöperate with the rods in guarding against independent lateral movement of the outer portion of the wheel, and in this connection it will be noticed that instead of having the sides of the bridge-pieces fitting flatly against the rods for their entire length they may be concaved, as shown in Fig. 5, in order that the compression of said tubular portions incident to the flattening of the tire may cause said contiguous portions to bow outwardly, as indicated by dotted lines, Fig. 5. By this construction of the tubular bridge-pieces their central portions, even at the inner and outer sides of the rods, will have but little frictional bearing thereon, and thus reduce the tendency to become heated through friction in a material degree.

A wheel of the character described will have practically the same resiliency, as hereinbefore stated, as an ordinary pneumatic-tired wheel, but will be far more durable, and its first cost will be but little more than the ordinary wheel, for the reason that the pneumatic cushion can be made much lighter than the ordinary pneumatic tire, because its location eliminates practically all danger of puncture. Furthermore, as it does not come into direct contact with rocks and other small objects its compression is not spasmodic—that is, its area of contact is large and its compression more uniformly distributed.

From the above description it will be apparent that I have produced a wheel possessing the features of advantage enumerated as desirable and which obviously may be modified in minor particulars without departing from the principle of construction involved.

Having thus described the invention, what I claim as new, and desire to secure by Letters Patent, is—

1. A wheel comprising a rigid inner portion having an encircling ring, a rigid outer portion having an inner circular ring and an outer encircling ring, a circular pneumatic cushion between the ring of the inner portion and the inner ring of the outer portion, and radial rods extending through the pneumatic cushion and the rings in contact therewith and clamping the latter tightly upon the former.

2. A wheel, comprising a rigid inner portion having an encircling ring, a rigid outer portion having an inner circular ring and an outer encircling ring, a circular pneumatic cushion between the ring of the inner portion and the inner ring of the outer portion, and radial rods extending through the pneumatic cushion and through the rings in contact therewith and secured rigidly to one of the portions of the wheel and provided with cap-screws at their opposite ends.

3. A wheel, comprising a rigid inner portion having an encircling ring, a rigid outer portion having an inner circular ring and an outer encircling ring, a circular pneumatic cushion between the ring of the inner portion and the inner ring of the outer portion, radial rods extending through the pneumatic cushion and through the rings in contact therewith and secured rigidly to one of the portions of the wheel and provided with cap-screws at their opposite ends, and cushions mounted on said rods and interposed between the cap-screws and the contiguous ring.

4. A wheel, comprising a rigid inner portion having an encircling ring, a rigid outer portion having an inner circular ring and an outer encircling ring, a circular pneumatic cushion between the ring of the inner portion and the inner ring of the outer portion and provided with radial tubular cross-pieces, and radial rods extending through the tubular cross-pieces and the rings in contact with the pneumatic cushion.

5. A wheel, comprising a rigid inner portion having an encircling ring provided with apertures, a rigid outer portion having an outer and an inner ring, the latter provided with slots in radial alinement with said apertures, a circular pneumatic cushion fitting between the ring of the inner portion and the inner ring of the outer portion and provided with radial tubular cross-pieces registering with said radially-alined apertures and slots, rods extending through the said tubular cross-pieces and the registering apertures and slots and secured rigidly at their inner ends to the inner portion of the wheel, cap-screws engaging the outer ends of said rods, and cushions upon the rods and interposed between said cap-screws and the inner ring of the outer portion of the wheel.

In testimony whereof I affix my signature in the presence of two witnesses.

CHARLES A. LEE.

Witnesses:
   H. C. RODGERS,
   G. Y. THORPE.